United States Patent [19]
Loxley et al.

[11] 4,072,489
[45] * Feb. 7, 1978

[54] VACUUM PROCESS FOR AVOIDING DEVITRIFICATION DAMAGE TO TRANSPARENT SLIP-CAST SILICA CRUCIBLES

[75] Inventors: Ted A. Loxley; Walter G. Barber; Walter W. Combs, all of Mentor; John M. Webb, Chargin Falls, all of Ohio

[73] Assignee: Sherwood Refractories, Inc., Cleveland, Ohio

[*] Notice: The portion of the term of this patent subsequent to Sept. 24, 1991, has been disclaimed.

[21] Appl. No.: 684,730

[22] Filed: May 10, 1976

Related U.S. Application Data

[63] Continuation-in-part of Ser. No. 495,129, Aug. 5, 1974, Pat. No. 3,972,704, which is a continuation-in-part of Ser. No. 363,622, May 24, 1973, Pat. No. 3,837,825.

[51] Int. Cl.² .............. C03B 23/20; C03B 32/00
[52] U.S. Cl. .............................. 65/18; 65/32; 65/33; 65/DIG. 8
[58] Field of Search ............ 65/32, 18, DIG. 8

[56] References Cited

U.S. PATENT DOCUMENTS

| | | | |
|---|---|---|---|
| 2,982,053 | 5/1961 | Elmer | 65/32 X |
| 3,261,676 | 7/1966 | Morelock | 65/32 |
| 3,837,825 | 9/1974 | Loxley et al. | 65/32 X |
| 3,850,602 | 11/1974 | Bruning | 65/32 X |
| 3,853,520 | 12/1974 | Rau | 65/32 X |

Primary Examiner—Robert L. Lindsay, Jr.
Assistant Examiner—Frank W. Miga
Attorney, Agent, or Firm—Bosworth, Sessions & McCoy

[57] ABSTRACT

A process is disclosed for making vitreous silica crucibles of exceptional high quality for use in the growing of a silicon crystal from molten silicon. The crucibles are formed from fine particles of high purity fused silica by slip casting or other suitable process, are dried and fired to provide a rigid porous body, and are thereafter sintered to a high density, preferably to the transparent state. The invention solves the problem of spalling, blistering and cracking during crystal growing and the resulting contamination of the molten silicon, which has long plagued the industry, by eliminating water from the fused silica particles before the porous body is sintered to the transparent state. Said body is thoroughly dried in a vacuum furnace at a high temperature and at a sub-atmospheric pressure low enough to remove the chemically bound water which cannot be removed by heat alone. The crucibles of this invention retain their transparency and high quality without spalling or introducing microscopic particles of silica into the silicon, thereby making it possible to grow a silicon crystal of highest quality without dislocations and imperfections due to contamination by said particles.

7 Claims, 2 Drawing Figures

VACUUM PROCESS FOR AVOIDING DEVITRIFICATION DAMAGE TO TRANSPARENT SLIP-CAST SILICA CRUCIBLES

REFERENCE TO RELATED APPLICATIONS

This application is a continuation-in-part of copending application Ser. No. 495,129, filed Aug. 5, 1974, now U.S. Pat. No. 3,972,704 which is a continuation-in-part of application Ser. No. 363,622, filed May 24, 1973, now U.S. Pat. No. 3,837,825. This application is directed to subject matter disclosed in said applications, which are incorporated herein by reference.

BACKGROUND OF THE INVENTION

The present invention relates to a process for making silica crucibles and other articles from finely divided silica particles and more particularly to the manufacture of sintered vitreous silica receptacles having exceptional resistance to spalling, blistering or deterioration during devitrification. The process makes it possible to mass produce precision transparent or translucent vitreous silica crucibles which remain transparent or avoid deterioration when devitrified in contact with molten silicon during the growing of a silicon crystal, thereby avoiding contamination and permitting formation of a silicon crystal of highest quality.

Heretofore, vitreous silica articles have been fabricated by glass working, slip casting, pressing, or the like. Glass working methods involve heating the glass to a temperature, such as 3500° F. or higher to lower the viscosity to a point where the glass may be subjected to plastic deformation, as by rolling, pressing or drawing. Slip casting has also been used extensively for making a variety of vitreous silica articles, particularly refractory articles having a density below 90 percent of theoretical which are to be subjected to intermediate temperatures below 2000° F. In recent years, slip casting has also been used for making high density vitreous silica articles, such as crucibles for growing of silicon crystals.

Hot pressing and other pressing operations are not used extensively in the commercial fabrication of common vitreous silica products, but pressing techniques can be used for such purposes and can be used to produce sintered full density silica products.

For many years, prior to the present invention glass working produced the best crucibles for use in the growing of silicon crystals. Sintered crucibles formed by slip casting have also been used because of lower cost of manufacture, but they have been considered inferior to the blown-glass crucibles.

Crucibles have also been made by the arc-fusion process in which quartz sand is melted at a high temperature above 3500° F. while positioned against a graphite mold by centrifugal force. The arc-fusion process avoids substantial devitrification and makes it possible to produce an amphorous silica with good thermal shock resistance, but the unmelted sand provides the resulting crucible or other silica glass products with a rough surface which is undesirable. The crucibles made by the arc-fusion process are clearly inferior to the high quality crucibles which can be made by slip casting according to U.S. Pat. No. 3,837,825, for example.

As pointed out in the latter patent the manufacturing process must be properly controlled to make possible manufacture of high quality transparent silica crucibles or other articles by a sintering operation because of the nature of silica and the need to avoid formation of substantial amounts of cristobalite. The latter undergoes the alpha-beta inversion at a temperature between 340° and 510° F. and, when present in relatively small amounts, such as a few percent by weight, causes the silica to crack or deteriorate when it reaches the inversion temperature during cooling of the sintered product. Because the rate of formation of cristobalite increases rapidly when vitreous silica is heated above 2200° F.*, it has been a common procedure to fire slip cast products at temperatures not substantially greater than 2200° F.

*The rate of formation of cristobalite at 2400° F. is perhaps at least ten times the rate of formation at 2200° F.

One technique which reduces the cristobalite problem is to raise the temperature somewhat above the melting point of cristobalite at the end of the sintering operation, thereby destroying the cristobalite formed during sintering. This does, however, result in flow of the glass and requires a supporting mandrel to maintain the desired shape as disclosed, for example, in U.S. Pat. No. 3,763,294.

In the case of vitreous silica crucibles used to hold molten silicon during the growing of silicon crystal rods, the crucible was considered undesirable if it contained substantial amounts of cristobalite. At the present time, and for many years prior to this invention, cristobalite has been considered undesirable by those that manufacture silicon crystal rods, because of the blistering or deterioration which normally results during formation of cristobalite. The present invention contradicts the established concepts and involves a discovery which revolutionizes the industry by avoiding such deterioration.

In the typical process for the manufacture of silicon crystal rods, a crystal growing apparatus is employed which may, for example, be of the general type disclosed in U.S. Pat. No. 3,094,006. In the crystal growing process, the vitreous silica crucible contains the molten silicon from which the crystal rod is grown. The silicon in the crucible is initially heated for about one-half hour to a temperature of about 2585° F. A seed crystal is introduced into the molten silicon and the silicon crystal is pulled for a period of about 8 to 16 hours at about 2585° F.

Heretofore, a transparent amorphous quartz glass crucible, even if formed essentially free of cristobalite, would deteriorate during this operation by devitrification. The presence of even relatively small amounts of impurities or a small amount of cristobalite in the crucible at the beginning of the heating period was considered highly undesirable because it accelerated this deterioration. Therefore, it was considered essential, prior to this invention, to employ transparent silica crucibles of highest quality — preferably pure quartz glass crucibles made by glass working, for example, formed from quartz glass tubing.

In recent years, slip cast crucibles have been produced according to said Pat. No. 3,837,825 with a very high quality, but these were generally considered inferior to blown-glass crucibles up to the time of the present invention. In accordance with said patent, vitreous silica crucibles of high quality are made from particles of fused silica which are molded or formed by slip casting or pressing. A slip-cast crucible, for example, which has been dried and fired at a high temperature such as 2100° F. is heated rapidly to a high temperature, such as in the range of 3000° F to 3100° F. or higher, and maintained at a temperature in that range in a furnace for a short period of time, such as 1 to 5 minutes, to sinter the fused silica and to increase the density to 99 percent or greater while avoiding significant devitrification and maintaining the desired shape. Such heating may, for example, be carried out in a furnace containing an inert gas, such as helium, nitrogen or argon. Where the vitreous silica article is to be transparent, the sintering may be carried out in a vacuum or in an atmosphere of helium. of the type disclosed in said Pat. No. 3,837,825 made it possible to produce transparent crucibles of extremely high quality. The reported inferiority of the slip-cast crucibles as compared to glass-worked or blown-glass crucibles was perhaps due more often to chemically-bound water in the silica glass than to a high cristobalite content or impurities in the glass. The typical slip-cast and blown-glass crucibles being manufactured for crystal growing contained a substantial amount, such as 100 parts per million or more, of chemically bound water which is trapped in the glass and can not be removed during heating because of the impermeable nature of glass.

Those skilled in the art were not aware of the significance of such small amounts of chemically bound water and continued to produce slip-cast and blown-glass crucibles which had an excessive water or hydroxyl content and were subject to spalling and blistering during devitrification. The deterioration which occurred during the formation of cristobalite resulted in contamination of the molten silicon during crystal growing and sometimes catastrophic crucible breakage, but such deterioration was accepted for two decades as an inherent and inevitable consequence of devitrification.

The need to remove chemically bound water and the importance of low water content were not recognized prior to this invention and apparently were not recognized long after the invention was in commercial use because competitors continued to make inferior slip-cast crucibles with an excessive water or hydroxyl content and manufacturers of silicon crystal rods continued to consider cristobalite as the problem rather than water content. Many of such manufacturers still fail to understand how a blown-glass crucible can be inferior to a slip-cast crucible.

SUMMARY OF THE INVENTION

The present invention solves the problem of spalling, blistering and cracking of vitreous silica crucibles and other articles during devitrification by eliminating water from the glass and providing an extremely low water content. The finished sintered vitreous silica crucible or other product is provided with an infrared absorption beta OH factor below 0.04 as measured on an infrared spectrophotometer in the usual manner.

In the case of slip-cast or pressed crucibles formed of small silica particles, this may be achieved by firing the porous crucibles in a vacuum furnace at a suitable temperature below the sintering temperature, such as 2000° F. to 2200° F., before the final sintering operation (for example in an induction furnace). The degree of vacuum required depends on a number of variables including porosity, particle size and temperature. The pressure employed during the vacuum drying operation is usually low enough to permit drying in a reasonably short period of time and, therefore, a high vacuum is preferred.

When the silica crucible is formed by slip casting in accordance with said U.S. Pat. No. 3,837,825, the vacuum drying is carried out in a vacuum furnace for a suitable period of time while the crucible is porous, and, thereafter the dried crucible is sintered at a temperature above 2400° F. and usually above 2950° F. to a high density, such as 99 percent or higher. The crucible is preferably supported on a shaped refractory mandrel or support during sintering.

For example, in accordance with said patent, the porous vitreous silica crucible may be placed on a graphite mandrel which is mounted to move vertically into and out of the furnace and may be rapidly heated in the furnace from a temperature below 2200° F. (1204° C.) to a sintering temperature, such as 2950° to 3150° F. (1620° to 1732° C.) or higher within one minute. The silica crucible can be sintered to the transparent state by heating it in the furnace for 1 to 8 minutes at such a sintering temperature in a vacuum or in an atmosphere of helium. The sintering temperature can be below the melting point of cristobalite; and, if it is desired to eliminate the cristobalite, the temperature can be about 3200° F. (1760° C.) at the end of the sintering operation. The vitreous silica crucible is then cooled and removed from the mandrel.

Transparent slip-cast silica crucibles made in this way and having a low water content in accordance with this invention are vastly superior to typical blown-glass crucibles made from silica glass tubing. Such slip-cast crucibles can be made so that they remain transparent as they are completely devitrified during prolonged contact with molten silicon. They are, therefore, ideally suited for the growing of silicon crystals and may cause the more expensive blown-glass crucibles to become obsolete.

An object of the present invention is to increase the useful life of precision vitreous silica crucibles used for holding molten silicon metal during the growing of a silicon crystal rod.

A further object of the invention is to provide improved vitreous silica articles which are not seriously damaged by spalling, flaking, blistering or cracking when they are converted to cristobalite during high temperature use.

Another object of the invention is to provide transparent vitreous silica receptacles of extremely high quality which remain transparent after devitrification.

These and other objects, uses and advantages of the invention will become apparent to those skilled in the art from the following description and claims.

DESCRIPTION OF THE PREFERRED EMBODIMENTS

Figure 1:
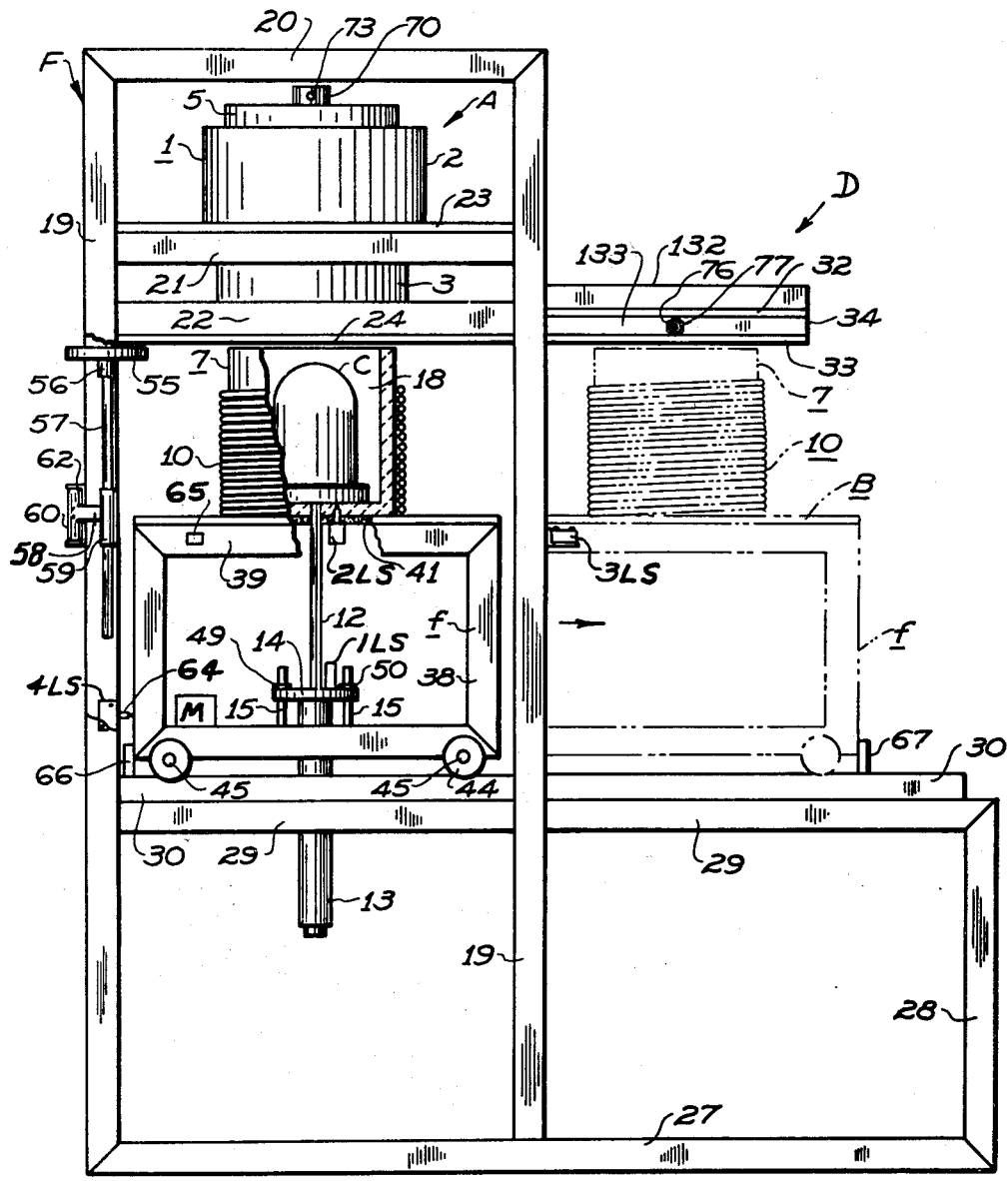
FIG. 1 is a side elevational view on a reduced scale, with parts omitted and parts broken away and shown in section, of an apparatus for sintering crucibles in accordance with the present invention, the moved position of the cooling unit being shown in dot-dash lines.

The present invention is particularly concerned with hollow molded articles, such as tubular or cup-shaped receptacles and other silica glass articles, made by sintering and/or fusing finely divided silica particles. The silica particles are preferably vitreous silica particles of high purity — that is, having a purity of at least 99.5 percent. The purity is preferably at least 99.75 percent by weight; and, when making transparent silica crucibles, the silica particles are preferably essentially pure or have a purity of 99.95 percent or higher as disclosed in said Pat. No. 3,837,825. However, the process of this invention makes it possible to produce satisfactory crucibles from silica particles of lower purity because cristobalite is less of a problem during crystal growing.

The silica is considered "essentially pure" if it will contain no more than 0.05 percent of impurities when heated to a sintering temperature, such as 2200° F. (1204° C.) or higher. A somewhat lower purity might be acceptable if the impurity is a compound, such as silicon carbide, silicon nitride, zirconium oxide or aluminum oxide. Significant amounts of fluxing impurities should, of course, be avoided. The silica may contain a small percentage (e.g., less than one percent) of an organic material, such as polyurethane rubber, which burns off without leaving a substantial residue. Satisfactory results can, therefore, be obtained by grinding fused silica in a ball mill even if the resulting fused silica powder contains small amounts of rubber or other organic polymer.

Advantages of the present invention are obtained when the crucible or other silica article is made in a number of different ways, provided that the article, as formed, has a porosity or permeability which permits the subsequent vacuum drying operation. For example the crucible could be formed on a mandrel or other form by conversion of a silicon compound, such as silicon tetrachloride vapor, or by a deposition process other than slip casting.

Best results are obtained, however, when the article is formed of fine particles of vitreous silica.

The silica used in the practice of this invention is preferably a vitreous silica of high purity obtained from quartz sand or rock crystal and may, for example, be obtained in the desired particle size by pulverizing or grinding essentially pure fused quartz or rock crystal having a purity of 99.95 or 99.99 percent or higher. The fused quartz should be substantially free of foreign matter or should be cleaned so that, after grinding, the fused quartz has the desired purity. Excellent results can also be obtained from synthetically produced vitreous silica having the desired purity.

The fused quartz or silica may be pulverized in various ways without introducing significant amounts of impurities. This is preferably accomplished in a ball mill, but the fused quartz may also be pulverized by crushing or by explosion or impact of particles on each other at high velocity. Pulverization could be accomplished using a vibro-energy mill, a Katy mill, a rod mill or an ultrasonic mill, for example.

Excellent results can be obtained by grinding fused quartz in a conventional ball mill having balls or stones formed of essentially pure vitreous silica and having a low-ash rubber lining; such as a polyurethane rubber or other suitable organic lining.

The liquid employed during grinding is preferably distilled water so that a slurry is produced suitable for conventional slip casting. However, the vehicle used for the slurry may be a liquid other than water, particularly a liquid which will evaporate without leaving a significant residue. A polar liquid, such as kerosene, for example, could be used, and the crucibles or other products could be formed by slip casting using a kerosene vehicle. Likewise a slurry with an organic liquid vehicle could be used in various molding methods different from slip casting.

The optimum size of the silica particles used in the practice of this invention depends somewhat on the type of process employed and the type of article being formed. In some cases, significant advantages can be obtained by employing a mixture of silica particles of different sizes. Generally this is not so important when forming silica crucibles. If a pressing or isostatic pressing method is employed, the particle size of the silica particles could be greater than would be desirable if slip casting were employed. In general, best results are obtained using extremely small particles since this facilitates removal of water in the vacuum furnace.

In general, the vitreous silica particles used in the practice of this invention have a particle size preferably no greater than 325 Tyler mesh. The average particle size is preferably between 1 and 10 microns, particularly when slip casting is employed, and much finer particles can be used. If silica particles are employed with a particle size substantially less than 0.1 micron, they are usually used in minor amounts, but it will be apparent that extremely small particles can be used.

In general, the process of the present invention can be carried out using colloidal particles of various sizes or using particles with any size suitable for slip casting. It will also be understood that, while large particles are undesirable when attempting to effect a thorough vacuum drying, small amounts of large particles can sometimes be tolerated, particularly where they are not present in substantial amounts at the inner surface of the receptacle or other critical surfaces of the article. The particle size is preferably no greater than 100 microns when making silica crucibles.

The material used in the practice of this invention to form the crucible or other articles usually consist essentially of fused silica particles and, where slip casting is employed, a suitable vehicle such as kerosene or distilled water. While additives or a binder can be used to assist in holding the particles together, it is preferred not to employ them, particularly when making a transparent vitreous silica article.

The desired article may be formed from the pulverized fused silica particles by a hot- or cold-pressing operation or the like or by a conventional slip-casting procedure using a porous mold with an interior surface shaped to conform to the exterior surface of the crucible or other desired article. The article can be slip cast at atmospheric pressure. The material used to form the porous mold may be graphite, plaster of Paris, or silica, or other suitable mold material and may be coated or lined with a protective layer of a material which minimizes contamination of the final product including carbon, graphite or high-purity combustible organic material, such as polyurethane or Teflon, which can be eliminated by firing of the molded article, or silicon metal or silicon-containing compounds which are tolerable in the final product, such as silicon carbide, silicon nitride ($Si_3N_4$) or silica ($SiO_2$).

For example, the porous shaping surface of the porous mold can consist of or be coated with a high-purity material selected from the group consisting of silicon metal, silicon carbide, silicon nitride, silica and mixtures thereof. The shaping surfaces of the mold used for slip casting or molding the crucible or other silica receptacle has a smooth shaping surface preferably formed to the desired shape with close tolerances and with a very smooth surface preferably having pores no greater than 10 microns in diameter. The preferred porous mold is formed of silica or has a silica shaping surface.

Slip casting with the porous mold can be carried out in a conventional manner as disclosed in said application Ser. No. 495,129 and in application Ser. No. 363,622, now U.S. Pat. No. 3,837,825. The slurry containing pulverized fused silica suspended in distilled water is poured into the mold to fill the mold cavity. The porous mold draws the water out of the slurry so that, after a suitable period of time, such as 10 to 20 minutes or so, the desired wall thickness will be obtained. At the end of such period, the mold is turned upside down to remove the excess slurry, returned to its upright position, and thereafter allowed to dry.

The resulting slip-cast crucible will shrink slightly so that it can easily be removed from the mold. At this stage the crucible has a substantial water content and includes chemically combined water in the form of hydroxyl groups; it is porous and has sufficient strength to support itself so that it can be dried in the conventional manner with or without internal support from a mandrel or the like.

After removal from the porous mold, the porous crucible or other silica article can be dried thoroughly before firing to avoid possible damage from too rapid moisture evolution.

Drying of the crucibles can be effected in various ways as disclosed in said Pat. No. 3,837,825. A convenient method is to dry the crucibles or other articles overnight at 110° to 120° F. and thereafter to dry it for several more hours at a temperature of 300° to 400° F. In carrying out the process of this invention the article would be dried in a vacuum furnace prior to final sintering from the porous state to the high-density state.

In any event the article is preferably fired prior to the final sintering operation. Such firing evaporates the water and eliminates combustibles, such as rubber particles from the ball mill lining or graphite particles during slip casting. After such firing the porosity is at least 15 or 20 volume percent.

In one embodiment described in said Pat. No. 3,837,825, the crucibles or other articles are thoroughly dried at a temperature of 100° to 400° F. and then fired at a temperature of 2000° to 2200° F. for a suitable period of time, such as 20 to 60 minutes or more, to eliminate the combustibles and the free water and to strengthen the articles for easy handling. The fired articles would be stored in a dry location until the final sintering at a higher temperature (for example, above 2700° F. or above 3000° F.).

Such a drying and firing procedure removes most of the water and, prior to this invention, the resulting product would be considered dry and not capable of being significantly improved in quality even if it contained more than 100 parts per million of chemically bound water.

The present invention involves the discovery that normal firing of the slip cast crucibles or other articles at atmospheric pressure results in products which can not function in the optimum manner and that tremendous improvement in the quality of crucibles and other articles can be obtained by eliminating most of the chemically-bound water from the silica glass, for example, by drying the porous slip-cast article in a vacuum furnace. The vacuum drying can be effected in various ways with varying degrees of vacuum (for example, at pressures of 1 to 100 microns), depending on the porosity and permeability of the article being dried and the size and type of silica particles forming the article. The results improve as the pressure is reduced. The drying is preferably carried out with a substantial vacuum at a temperature below the sintering temperature and preferably below the temperature at which cristobalite forms rapidly (not in excess of 2200° F.). The amount of vacuum employed during drying should be such that the vitreous silica of the finished crucibles or other articles has an infrared absorption beta OH factor that is below 0.04 and preferably substantially below 0.04 as measured on an infrared spectrophotometer. For example, such beta OH factor may be below 0.02 or below 0.01 in crucibles of high quality.

After vacuum drying for up to a few hours at a firing temperature, such as 2000° to 2200° F. (1093° to 1204° C.), the crucibles can be cooled and stored for a period of time at room temperature before they are sintered to a high density. If they are to be sintered in a vacuum, such sintering can take place immediately after the aforesaid vacuum drying operation. It is convenient, however, to effect sintering in an apparatus of the type disclosed in said U.S. Pat. No. 3,837,825, which is incorporated herein by reference.

Figure 2:
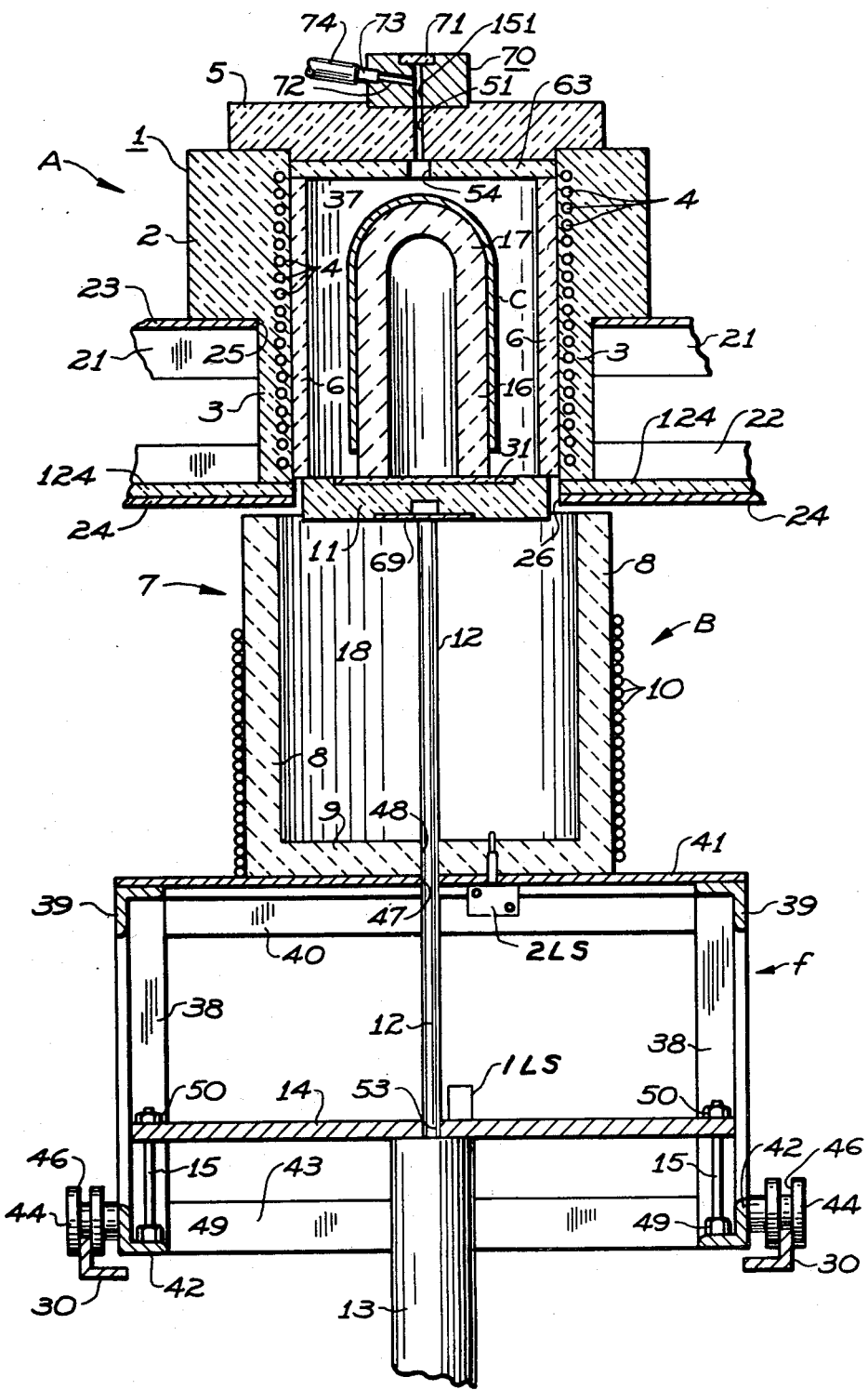
FIG. 2 is a fragmentary transverse sectional view of the apparatus of FIG. 1 on a larger scale, the graphite mandrel and the crucible being shown in the upper position.

Referring more particularly to the drawings, in which like parts are identified by the same numerals throughout the several views, FIGS. 1 and 2 show a special induction furnace which may be used to make crucibles according to this invention. The furnace has a stationary upper furnace unit A, a lower movable cooling unit B, and a rigid metal frame F supporting the units A and B for providing a guide means to support the movable cooling unit and allow it to be moved from the normal position shown in solid lines in FIGS. 1 and 2 to the unloading position shown in dot-dash lines in FIG. 1.

The induction furnace unit A has an annular refractory body 1 which comprises a relatively thick upper cylindrical portion 2, a cylindrical portion 3 of reduced thickness, and a helical copper heating coil 4 embedded in the refractory material of the body 1 coaxial with the internal cylindrical surface of said body 1. The top of the furnace unit A is covered by a flat circular refractory cap 5 which fits the body 1 in sealing engagement throughout its periphery. A flat circular refractory plate 63 of uniform thickness engages the flat bottom surface of the cap 5. A cylindrical refractory sleeve 6 of uniform thickness fits inside the body 1, as shown in FIG. 2, and extends from the margin of the plate 63 to a point near the bottom of the body 1. A flat plate 24 is provided under the body 1 and has a circular opening 26 with a diameter equal to the internal diameter of said body. A refractory plate 124 covers the plate 24 and engages the bottom of the body 1.

A cylindrical refractory heat sink or cup 7 of uniform wall thickness forms the cooling chamber 18 of the movable unit B and is positioned coaxial with the sleeve 6 and the furnace body 1 as shown in FIGS. 1 and 2. The flat annular upper surface of the cylindrical wall 8 of said cup is located adjacent to or closely spaced from the flat bottom surface of the plate 24 to retain gases in the chamber 18 with limited air flow through the small clearance space between the upper furnace unit A and the lower cooling unit B. Such clearance space is provided between the cup 7 and the plate 24 to permit easy movement of the unit B in a horizontal direction.

The wall portion 8 is preferably integral with the flat circular base portion 9 and is surrounded by a cooling coil 10, which is coaxial with the cup. If desired, such coil can be embedded in the cup like the coil 4 described above. The water or other cooling fluid is constantly circulated through the coil 10 to maintain the walls 8 at a moderate temperature such as 300° to 400° F., and to effect cooling of the mandrel 16 at the desired rate. The base portion 9 has a hole 48 for receiving the piston rod 12, which remains coaxial with the wall 8 during reciprocation of the circular refractory support plate 11. The unit B shown herein has a pneumatic cylinder 13 with a piston which reciprocates the support plate 11 between a normal retracted position in engagement with the base 9, as shown in FIG. 1, and an uppermost position adjacent to the bottom marginal surface of the sleeve 6, as shown in FIG. 2. The cylinder 13 may be rigidly mounted on the frame f of the unit B by means of a horizontal mounting plate 14 and bolts 15.

The support plate 11 shown herein is recessed to receive a circular plate 31 of uniform thickness having a flat upper surface perpendicular to the piston rod 12. The lower surface of the support plate may be recessed in a similar manner to receive a flat circular metal plate 69 which is connected to the piston rod.

As herein shown, the refractory support plate 11 has a diameter slightly greater than the internal diameter of the sleeve 6 and less than the internal diameter of the circular hole in plates 24 and 124 so that the furnace chamber 37 is substantially closed when the plate 11 is in its upper position. However, a clearance space or other opening may be provided to allow some of the furnace gases to move downwardly through or past the plate 11. A continuous flow of helium may be provided through the furnace to flush out any air that may leak into the furnace during the cycle.

A shaped support or susceptor 16 of circular cross section is rigidly mounted on the flat upper surface of the refractory plate 31 in a position coaxial with the piston rod 12 so as to be located coaxial with the refractory sleeve 6 when a crucible c is placed in the furnace chamber 37 of the furnace unit A. The susceptor is preferably convex and has an exterior surface which has a shape corresponding to the shape of the crucible. As herein shown, the susceptor comprises a mandrel having a hollow hemispherical upper portion 17.

The material used to form the furnace body 1, the cover 5, the cup 7 and the circular support plate 11 is preferably a refractory material which is not damaged by high temperatures. Such material may be a conventional refractory material used for metal casting and containing zirconium silicate, aluminum silicate, fused silica and/or refractory oxides, such as oxides of aluminum, zirconium, magnesium, beryllium or titanium. The inner surface of the furnace, the outer surface of the mandrel 16, and preferably also the inner surface of the cup 7 are formed of a refractory material, such as graphite of platinum, which is capable of withstanding temperatures of 3000° to 3400° F. or higher, and which does not cause a damaging reaction with the fused quarts of the crucible. In the apparatus shown herein, the mandrel 16, the entire cup 7 of the cooling unit B, and the sleeve 6 and plates 31, 63 and 124 of the furnace A are formed of graphite.

When induction heating is employed, the sleeve 6 should contain a material having magnetic susceptibility which can be heated by the induction coils of the furnace. The term "susceptor" is used herein to indicate such susceptibility. In the apparatus shown in the drawings, the convex form or mandrel 16, the plate 63, and the sleeve 6 are susceptors and function to heat the quartz crucible to the desired sintering temperature. The sleeve 6 and the plate 63 may be heated to a temperature of 3000° F. to 3200° F. or somewhat higher. The mandrel is heated to a lower temperature, such as 2950° F. to 3150° F., during the sintering operation and is then cooled to a lower temperature, such as 2500° to 2700° F. to facilitate handling of the crucible.

A refractory cover plate or the like may be provided for covering the bottom end of the furnace body 1 when the unit B is moved away from the unit A. A cover plate 55 may be provided for this purpose and mounted to swing about a vertical pivot into and out of a closing position.

The apparatus shown in FIGS. 1 and 2 has a rigid metal frame F including four vertical legs 19 interconnected by four horizontal angles 20. The legs 19 are rigidly connected to an intermediate rectangular framework comprising four horizontal metal angles 21, which support a rectangular flat plate or insulating board 23 in a horizontal position. Such board may be formed of a heat resistant material and may have a thickness of one-fourth to one-half inch. A similar insulating board 124 is supported in a horizontal position parallel to the board 23 by four metal angles 22. Circular holes 25 and 26 are provided at the centers of the insulating boards 23 and 124, respectively, as shown in FIG. 2 so that the furnace body 1 may be mounted with its axis in a vertical position and supported by the two insulating boards. A graphite plate 24 of the same shape as the board 124 and having a thickness of one-fourth to one-half inch may be mounted below said board.

The frame F also includes a pair of horizontal longitudinal angles 27, which are rigidly connected to the bottom portion of the legs 19, and a pair of horizontal longitudinal angles 29 parallel to the angles 27. Short vertical angles 28 are rigidly connected between the angles 27 and 29 to provide supports for the horizontal angles 29 and for a pair of straight longitudinal rails 20, which are rigidly mounted on the angles 29. The rails engage the wheels 44 of the cooling unit B and provide means for guiding the unit horizontally from a normal operating position below the furnace unit A to an unloading position below the insulating unit D.

As shown, the unit D is rigidly mounted in cantilever fashion on the legs 19 of the frame F and comprises a pair of plates 32 and 33 supported on four metal angles 132 and spaced apart by graphite bars 133 which extend around the periphery of the unit D.

The graphite plates 32 and 33 are of the same size and shape and are provided with central circular openings which permit the crucible to be moved upwardly by the piston rod 12 through the unit D to an unloading position as disclosed in more detail in said U.S. Pat. No. 3,837,825.

The movable cooling unit B shown herein is in the form of a truck or carriage and has its own rigid metal frame f comprising a number of metal angles welded or otherwise rigidly connected together. The frame f includes four vertical legs 38, which are connected at their upper ends to a pair of longitudinal horizontal angles 39, and a pair of lateral horizontal angles 40, the angles 39 and 40 forming a rectangular framework for supporting a flat rectangular plate or insulating board 41 in a horizontal position parallel to the rails 30 and the insulating boards 23 and 124 described above. The lower ends of the legs 38 are rigidly connected to a pair of longitudinal horizontal angles 42 and a pair of horizontal lateral angles 43. Four grooved wheels 44 are provided on the frame f with their horizontal shafts 45 mounted on the angles 42. Each wheel has a central groove 46 of a size to receive the rail 30. Fixed stops 66 and 77 may be provided on the rails 30 to limit the travel and assist in locating the cup 7. Movement of the unit B between said stops may be effected manually in response to a signal or automatically by means of a suitable motor such as the motor M of FIG. 1, and a suitable electrical control (not shown) as disclosed, for example, in U.S. Pat. No. 3,827,825.

The air cylinder 13 and piston rod 12 may be mounted in any suitable manner. As herein shown, the piston rod 12 extends through a small circular hole 53 in the mounting plate 14 and through similar holes 47 and 48 in the board 41 and the refractory base 9, respectively. As herein shown, means are provided for adjustably mounting the plate 14 on the longitudinal angles 42 including the threaded bolts 15 and the adjusting nuts 49 and 50.

As shown in FIG. 1, the cover plate 55 is mounted on a hub 56 located on vertical rod 57. A supporting arm 58 has sleeves 59 and 60 at its ends. A vertical pivot pin 61 extends through sleeve 60 and mounting bracket 62 as disclosed in more detail in said U.S. Pat. No. 3,837,825.

In the apparatus of FIGS. 1 and 2, it is preferable to fill the furnace chamber 37 with helium and to maintain the helium atmosphere during the heating step. There is provided a flow of helium into the furnace chamber at a slow rate sufficient to maintain the desired inert atmosphere.

As herein shown, an externally cylindrical block 70 formed of metal or a refractory material is rigidly mounted on top of the refractory cover 5. The block has a central vertical passage 151, which is aligned with the central vertical passage 51 of the graphite plate 63 and has an inclined radial passage 72 extending from an inlet 73 to the passage 151. A quartz lens or sight glass 71 is mounted in a recess at the top of the passage 51 to permit viewing of the furnace chamber and use of a conventional optical pyrometer to measure the furnace temperature.

A flexible supply hose 74 is connected to the inlet 73 to supply helium to the furnace through the passages 72 and 51. Such hose is connected to a suitable constant pressure source of helium, such as one or more helium tanks having a constant pressure valve. The hoses 77 of the unit D may be connected to the same source. Argon may be supplied near the end of the sintering period to maintain thhe inert atmosphere.

It will be understood that manual or electrical control systems of various types may be provided to control operation of the apparatus of FIGS. 1 and 2. The control system may, for example, be of the general type disclosed in said U.S. Pat. No. 3,837,825.

In carrying out the process of the present invention, the final sintering operation may be carried out in the apparatus of FIGS. 1 and 2 in such a manner that devitrification is minimized. The dried slip-cast crucible is subjected to a final heating in the furnace unit A to effect sintering at a high temperature, such as 2950° F. or higher, in such a manner as to avoid excessive devitrification. For example, the crucible may be heated rapidly to a sintering temperature in a selected range, such as 3000° F. to 3150° F., and held at that temperature for a limited period of time, such as 1 to 5 minutes, to obtain the desired precision vitreous silica product.

In one embodiment of the invention, the slip-cast fused silica crucible or other casting is heated rapidly, preferably by placing it on a hot mandrel or support, which has a temperature of 2500° to 3000° F. and preferably 2600° to 2700° F., and quickly moving the casting on the support into a furnace having a temperature above 3000° F. (e.g., 3000° to 3200° F.). The temperature of the crucible or other casting is rapidly raised from below 2200° F. to 3000° F. or higher in two minutes or less and preferably in one minute or less and is held in the range of 3000° to 3150° F. for a sintering period of 1 to 6 minutes to provide a high density, such as 98 to 99 percent or higher, and, if desired, to provide a transparent silica glass. The heating is carried out in a manner to maintain the desired size and shape and to provide a precision product. When making precision crucibles in accordance with this embodiment, said sintering period can be 5 minutes or less and is usually at least 2 minutes.

The crucible is cooled after the silica glass reaches the desired maximum temperature, which may be 3050° F. to 3100° F. and below the melting point of beta cristobalite, or may be substantially higher. If desired the maximum temperature can be as high as 3200° F. before the glass is cooled.

The vitreous silica crucible is removed from the furnace after sintering and is cooled for a short period of time (i.e., one minute or less) on the graphite mandrel to an intermediate temperature, such as 2500° to 2700° F. before the crucible is removed from the mandrel and cooled to room temperature. The crucible is preferably cooled to a temperature below 2200° F. (1200° C.) within 2 or 3 minutes after it is removed from the furnace and before there is significant devitrification.

When it is desired to minimize or limit the formation of cristobalite, the crucible can be heated to increase the temperature from 2200° F. or below to the desired maximum glass temperature in no more than 8 minutes and is then cooled to a temperature below 2200° F. within a few minutes so that the silica of the crucible is subjected to a temperature above 2200° F. during such heating and cooling for a limited period of time, preferably no more than 10 minutes.

Highest quality vitreous silica crucibles or other articles are produced when the final sintering operation is carried out in a vacuum or in an atmosphere of helium, for example, to produce a fully dense or transparent product. Operation with helium is preferred because it permits operation at atmospheric pressure with inexpensive equipment and facilitates mass production of precision transparent articles with excellent thermal shock characteristics and a high quality smooth pore-free internal surface with a long life when in contact with molten silicon. Vacuum sintering produces an excellent product and is desirable in that it permits use of low sintering temperatures and less expensive heating means.

The mass production process described above and in said Pat. No. 3,837,825 is versatile and effective and permits manufacture of crucibles at low cost and at high rates up to 15 or more per hour with minimum waste due to scrapping of defective crucibles. The furnace temperature can be 2950° or 3200° F. and the heating time can be a few minutes or as much as 10 minutes. If a low sintering temperature is used, it is not necessary to support the crucible on a mandrel during sintering. If the silica glass is heated to a higher temperature to melt the cristobalite, a supporting mandrel will be required.

The simple furnace shown herein is adequate for most crucibles commonly used at the present time and is capable of heating the crucible to a preselected temperature range, such as 2950° to 3150° F., for the desired sintering period. However, more uniform heating may be desirable for extremely large crucibles. Generally the optimum heating times and temperatures increase as the wall thickness increases. However, relatively short heating times can be employed even when the wall thickness is as high as 0.4 inch. The wall thickness of the crucible is usually no more than 0.3 inch even for large crucibles and is preferably no more than 0.2 inch.

In said Pat. No. 3,837,825, the example which follows was described to illustrate manufacture of a precision transparent slip-cast silica crucible. As described therein, fused quartz with a purity of at least 99.97 percent is placed in the special ball mill described above together with distilled water and ground to minute size (−325 mesh) to produce a conventional slurry suitable for subsequent slip casting. The average particle size is about 2 to 4 microns. About four parts by weight of the fused quartz are employed for each part of water in each batch. A substantial number of batches are produced in this way, each having a weight of around 200 pounds.

Slip casting may, thereafter, be carried out using a porous mold, such as a graphite or silica mold or a graphite-lineed or silica-lined plaster mold, having an internal surface with a shape corresponding to that of the external surface of the desired crucible (for example, the crucible of FIGS. 1 and 2).

If a plaster mold is used, the internal surface can be wetted with water and coated with pure powdered graphite of small particle size, such as 10 to 50 microns, before the slurry is poured into the mold. The dry graphite powder is rubbed on the wet surface of the mold to provide a continuous shiny black coating, and any excess graphite is then wiped off.

The slurry is poured into the porous mold and, after a suitable period, such as 10 to 15 minutes, sufficient to obtain a wall thickness of about 0.1 inch, the mold is turned upside down to drain off the excess slurry and returned to the upright position. After drying for 30 minutes or so at 110° F., such crucible may, for example, have a wall thickness of 0.1 inch, an axial length of five inches and an external diameter of 5 inches.

The partially dried crucible is then placed in a heating chamber having a temperature of about 350° F. for a period of time at least sufficient to effect thorough drying (e.g., 1 to 4 hours) and the temperature of the air in the heating chamber is then raised slowly to a sintering temperature of 2100° F. to eliminate combustibles, to eliminate any absorbed water not previously removed, and to increase the strength of the crucible. After a sintering period, such as 1 to 2 hours, sufficient to provide strength for handling, the crucible is rapidly cooled with air to room temperature. At this time the crucible has a porosity in excess of 15 volume percent and is essentially dry but contains chemically combined water in the form of hydroxyl groups.

Dried slip-cast crucibles formed in this manner are then treated in equipment of the type shown in FIGS. 1 and 2 by placing each crucible on the graphite mandrel 16 when it has a temperature of about 2700° F. The crucible is fed to the furnace chamber on the mandrel and heated in the helium atmosphere for a suitable period of time, such as 3 to 4 minutes, to a temperature of about 3050° F. until the crucible is transparent. At the end of such period, the crucible is lowered to the position shown in FIG. 1 and allowed to cool in the helium atmosphere for around one-half minute to a temperature of about 2700° F. The crucible is then moved to the unloading position at D and removed manually by tongs or the like. It may be cooled rapidly to room temperature without breakage by placing it in water, but such rapid cooling is not necessary. Although the sintering temperature is below the melting point of cristobalite, the amount of cristobalite present is substantially less than one percent and obviously insignificant as evidenced by the transparency of the glass.

In carrying out the process described above, the sleeve 6, the plate 63, and other parts of the furnace may have a surface temperature of 3100° to 3200° F. or somewhat higher. The glass of the crucible is heated to 3050° F. in the above example.

The transparent silica glass crucible of the above example is a precision high-quality product having a low cristobalite content and is well suited for use in the growing of silicon crystal rods from molten silicon. However, the typical crucible made in this way contains too much chemically-bound water and usually has an infrared absorption beta OH factor of from about 0.1 to 0.15 or higher. This water or hydroxyl content is probably somewhat better than typical slip-cast crucibles manufactured by competitors but is high enough to cause serious deterioration of the crucibles as the vitreous silica is converted to cristobalite during contact with molten silicon.

The transparent silica glass crucible of the above example is materially improved if the initial firing (i.e., at 2100° F.) is carried on in a vacuum furnace at a pressure such as 0.5 torr to 10 torrs or less, low enough to lower the water content at least 50 percent or to remove essentially all of the water so that the glass of the finished transparent crucible has an infrared absorption beta OH factor which is relatively low (i.e., below 0.04). For example, in accordance with one embodiment of the present invention, the above example is modified by carrying on the firing at 2100° F. (1150° C.) in a vacuum furnace for 1 to 2 hours or more at a high vacuum to remove chemically-bound water so that the silica glass of the finished transparent crucible has an infrared absorption beta OH factor below 0.01 as measured on an infrared spectrophotometer. Such glass has much greater resistance to deterioration by devitrification than a silica glass produced by the procedure of the first example and can remain transparent as it is converted to cristobalite during growing of a silicon crystal from molten silicon.

Vitreous silica crucibles made according to this invention also function well when the infrared absorption beta OH factor is up to 0.04. With such a low water content, the crucibles of this invention avoid spalling and blistering and the resulting contamination of the molten silicon caused by release of minute or microscopic silica particles during the crystal growing process. They are, therefore, much better than typical blown-glass crucibles made from a vitreous silica tube.

In carrying out the present invention in accordance with the above example, the slip casting may be carried out using porous molds of various types, and the vacuum drying may be carried out at various temperatures and pressures to provide the desired ultimate water content. In the above example the vacuum-dried crucible is sintered rapidly to coalesce the silica particles and increase the density from substantially less than 90 percent of theoretical to full density in a few minutes, but it will be understood that other methods of sintering may be employed and that the sintering may be carried out in a furnace quite different from that shown herein.

It is conventional to dry a slip-cast crucible before firing it at a high temperature, such as 2000° F. (1093° C.) or higher, to avoid damage by rapid moisture evolution. In the practice of this invention the crucible may be dried in the vacuum furnace at atmospheric pressure before the furnace is closed and immediately thereafter subjected to vacuum drying for 1 hour or more in the same furnace at a higher temperature.

The typical slip-cast crucible has a porosity in excess of 15 volume percent and can be dried adequately in the vacuum furnace within a few hours at a temperature of 2100° F. to 2200° F. (1150° C. to 1200° C.) when using a suitable vacuum. This is particularly true when using a typical slurries wherein the average particle size and the particle size of the vast majority of the vitreous silica particles is no more than a few microns. However, more time may be required to remove the water from a relatively thick wall, and somewhat more water can be tolerated at a distance from the inner surface of the receptacle.

The process described above may be employed to make vitreous silica crucibles of various sizes and shapes. As disclosed in said Pat. No. 3,837,825 the crucibles often have a wall thickness of about 0.08 to 0.15 inch, a diameter of 4 to 8 inches and an axial length of 4 to 8 inches or more. The present invention applies to manufacture of these crucibles and also larger crucibles with diameters of 10 to 12 inches or more, axial lengths of 10 to 12 inches or more, and sometimes somewhat thicker or thinner walls.

While the process of this invention is particularly well suited to the production of thin-walled receptacles, such as crucibles, it is also advantageous for the manufacture of glass tubes, and various other molded or slip-cast articles which are subject to devitrification.

Various equipment may be employed to effect vacuum drying in accordance with this invention. Less expensive equipment, capable of providing the vacuum furnace with any desired pressure in the range of 0.5 torr to 10 torrs, can be employed, and a pressure of 1 torr or higher can sometimes be used, but better results are obtained when providing a high vacuum. As used herein, the latter term indicates a pressure of 1 millimeter of mercury or below. A high vacuum is desirable when attempting to provide the silica glass of the finished transparent crucible with an infrared absorption beta OH factor near or below 0.01, but the most practical beta OH factor may be much higher because of cost considerations and the need for higher rates of production.

The vacuum employed during drying is preferably high enough to effect outward movement and removal within a few hours of most of the chemically bound water from the silica particles forming the interior portions of the crucible walls remote from the outer surface. A very high vacuum is not required but can be employed to reduce the drying time or to minimize the hydroxyl concentration. A silica crucible can be improved by providing a very low beta OH factor, such as about 0.001 to 0.006, but crucibles manufactured according to the present invention are usually provided with a higher hydroxyl content.

The water content or hydroxyl concentration in a transparent glass is indicated by the magnitude of the dip in the near infrared portion of the transmittance curve at the fundamental OH absorption band. It is normally determined by use of a conventional infrared spectrophotometer because, in accordance with Beer's Law, it is directly proportional to the optical density per unit thickness or the absorption coefficient, $\beta$, which is the logarithm of the inverse of the internal transmittance. The standard way to determine the (OH) absorption coefficient, beta, of silica glasses is to measure the transmissivities of the silicon hydroxyl vibrational bands in the near infrared at wave lengths of a few microns (e.g., 3.5 microns or less). Such optical density or water absorption coefficient (commonly referred to as the beta OH factor) for high silica glass is determined by infrared spectroscopy as described in an article by T. Bell, G. Hetherington and K. Jack in "Physics and Chemistry of Glasses" (Vol. 3, 1962). A beta OH factor of 0.01 indicates a hydroxyl concentration of around 0.001 weight percent because, as explained in that article, the optical density as measured by an infrared spectrophotometer is about ten times the hydroxyl concentration.

In the practice of the present invention it will be understood that any fused silica can be used if it has the required high purity. As used in the present application, the broad term "fused silica" covers various forms of vitreous silica including synthetic vitreous silica (for example, produced from silica resulting from conversion of a silicon compound), fused quartz produced from clear crystalline quartz, and vitreous silica produced from sand. The latter may be transparent, tranlucent or opaque. The process of this invention may, for example, be employed to treat a crucible formed on a platinum or graphite mandrel by conversion of a silicon compound such as silicon tetrachloride vapor.

While various methods of sintering may be employed in the practice of this invention, it will be understood that torching of the crucible is undesirable in that it introduces water into the glass. For example, torching of the crucible as disclosed in U.S. Pat. No. 3,620,702 should be avoided because it inherently increases the water content to undesirable levels. Similar torching, as employed in the manufacture of blown-glass crucibles from vitreous silica tubing, can increase the infrared absorption beta OH factor of a typical crucible about 0.1 so that the crucible is subject to spalling or blistering during subsequent devitrification.

The process of this invention is intended to produce an essentially water-free amorphous silica product of high density. Removal of the chemically-bound water from the silica particles will not be achieved in the vacuum furnace if the temperature is excessive or in the normal sintering range because the particles will coalesce and block escape of the water before a substantial amount of water is removed. Vacuum drying of the silica article is effected at a temperature preferably not substantially greater than 2200° F. to avoid this premature blockage and to avoid formation of unacceptable amounts of cristobalite during such drying. Such limitation of the drying temperature allows removal of the chemically-bound water before there is too much devitrification, but it does not provide the sintering required to achieve a high density. In order to obtain the desired high density or transparent silica product, a much higher temperature is employed (e.g., in excess of 2400° F.). As pointed out herein and in said U.S. Pat. No. 3,837,825 such sintering to high density should be rapid to avoid forming excessive amounts of cristobalite and is preferably carried out at a high temperature to produce a transparent vitreous silica article. Because the temperatures required for the vacuum drying operation are much lower than those employed for the final sintering operation, these operations are carried out independently, although both operations could theoretically be carried out in succession using the same vacuum furnace, It will be understood that, unless the context shows otherwise, the term "transparent" refers to the silica glass itself regardless of the smoothness of the surface, and the term "high purity" indicates that the silica has a purity of at least 99.5 percent. The term "porous" as applied to the shaped silica article indicates permeability to passage of water.

The present invention is particularly advantageous for manufacture of vitreous silica crucibles of relatively large diameter or width having a large surface area in contact with molten silicon during the crystal growing operation. The walls of the silica crucible can be relatively thin since the crucible is supported within the larger graphite crucible of the crystal growing apparatus. The silicon crystals are usually grown by the well known Czochralski process in a conventional silicon-crystal growing apparatus, such as disclosed in U.S. Pat. No. 3,094,006. The silica crucibles usually have a rounded cross section but can be generally rectangular or can be provided with any desired shape.

It will be understood that, in accordance with the provisions of the patent laws, variations and modifications of the specific methods and devices disclosed herein may be made without departing from the spirit of the invention.

Having disclosed our invention, we claim:

1. In a process for manufacture of thin-wall crucibles for holding molten silicon during crystal growing comprising the steps of forming, from a slurry of finely divided silica particles of high purity, a porous vitreous silica crucible containing chemically combined water in the form of hydroxyl groups, drying the crucible and firing it to eliminate the combustibles and the free water, continuing the heating of the porous crucible at a temperature up to 2200° F. to strengthen the crucible, placing the crucible on a support shaped to support the inner surface of the crucible, heating the crucible on said support in a furnace to a sintering temperature to coalesce the particles and to provide a high-density transparent vitreous silica, and cooling the sintered crucible, the improvement wherein the silica particles of said slurry have an average particle size not in excess of 10 microns and wherein the chemically combined water is removed by heating the crucible, after said firing and before sintering to high density, to a temperature of from about 2000° to about 2200° F. and under a subatmospheric pressure not in excess of 10 torrs for a time period of at least one hour such that, after sintering, the transparent vitreous silica of the finished crucible has excellent optical transmittance in the near infrared and is not subject to damage by rapid devitrification during growing of the silicon crystal.

2. The process of claim 1 wherein the fired crucible is heated for about one to about two hours under a high vacuum such that the chemically combined water is eliminated before the silica is sintered to high density.

3. The process of claim 1 wherein the crucible is sintered to high density in a helium atmosphere at a temperature not in excess of 3150° F. for up to ten minutes so that cristobalite is retained in the finished crucible in a small percentage insufficient to damage the crucible when it is cooled.

4. The process of claim 3 wherein the formation of cristobalite is promoted by providing the silica particles of said slurry with an average particle size not in excess of 4 microns and wherein most of the chemically combined water is removed by heating the fired crucible under vacuum to a temperature up to about 2100° F.

5. A process according to claim 1 for producing high-purity cristobalite-containing crucibles wherein the fired crucible is heated for a period of time at a temperature above 2200° F. to form cristobalite before sintering of the crucible is completed in said furnace and said sintering is carried out at a temperature not in excess of 3150° F. and below the melting point of cristobalite whereby the cristobalite is retained.

6. A process according to claim 1 wherein most of the chemically combined water in the fired crucible is eliminated by heating the fired crucible under vacuum to a temperature of at least 2000° F. in no more than two hours.

7. A process for manufacturing thin-wall water-free crucibles for use in the growing of silicon crystal rods comprising the steps of slip casting a porous vitreous silica crucible of a predetermined shape from a slurry of finely divided silica particles of high purity having an average particle size not in excess of 10 microns, the silica of said crucible containing chemically bound water in the form of hydroxyl groups, drying the crucible to remove the free water and firing it to burn out the combustibles and to strengthen the crucible while providing a rigid body of high purity, placing the crucible on a refractory support, heating the crucible on said support in a furnace from a temperature below 2200° F. to a sintering temperature up to about 3150° F. in a vacuum or helium atmosphere for a period of at least several minutes to coalesce the particles and to provide a high-density transparent vitreous silica, and cooling the resulting transparent silica crucible, the chemically combined water being removed from the fired crucible before it is sintered to high density by firing it at a temperature up to 2200° F. for a substantial time period and under a high vacuum such that the transparent vitreous silica of the finished sintered crucible has a hydroxyl content so low that it is not subject to devitrification damage during growing of the silicon crystal.

* * * * *